(12) United States Patent
Salama et al.

(10) Patent No.: US 7,477,529 B2
(45) Date of Patent: Jan. 13, 2009

(54) HIGH-VOLTAGE POWER SUPPLY

(75) Inventors: Magdy Salama, Kitchener (CA);
Mehrdad Kazerani, Waterloo (CA);
Chun Ho Lam, Toronto (CA)

(73) Assignee: Honeywell International inc.,
Morristown, NJ (US)

( * ) Notice: Subject to any disclaimer, the term of this patent is extended or adjusted under 35 U.S.C. 154(b) by 709 days.

(21) Appl. No.: 10/630,684

(22) Filed: Jul. 31, 2003

(65) Prior Publication Data

US 2004/0085784 A1     May 6, 2004

Related U.S. Application Data

(60) Provisional application No. 60/422,845, filed on Nov. 1, 2002.

(51) Int. Cl.
*H02M 3/335* (2006.01)
*H02M 3/337* (2006.01)

(52) U.S. Cl. .......................................... 363/26; 363/61

(58) Field of Classification Search ............. 363/24–26, 363/59, 60
See application file for complete search history.

(56) References Cited

U.S. PATENT DOCUMENTS

| | | | |
|---|---|---|---|
| 3,573,595 A | 4/1971 | Galluppi | |
| 3,721,824 A | 3/1973 | Bristol | |
| 3,731,179 A | 5/1973 | Rademaker | |
| 3,819,942 A | * 6/1974 | Hastwell et al. | ............ 250/324 |
| 3,840,797 A | 10/1974 | Aggen et al. | |
| 3,872,370 A | 3/1975 | Regnault | |
| 3,902,108 A | 8/1975 | Sion | |
| 4,012,687 A | 3/1977 | Carter | |
| 4,060,726 A | 11/1977 | Luitwieler et al. | |
| 4,112,354 A | 9/1978 | Bahder et al. | |

(Continued)

FOREIGN PATENT DOCUMENTS

DE     1929520 A     2/1971

(Continued)

OTHER PUBLICATIONS

Salama, M.M.A. et al., "Design of Field-Controlled Multi-Layer Insulation System," IEEE Transactions on Electrical Insulation, vol. EI-21, No. 2, Apr. 1986, pp. 165-174.

(Continued)

*Primary Examiner*—Gary L Laxton
(74) *Attorney, Agent, or Firm*—Ingrassia Fisher & Lorenz, P.C.

(57) ABSTRACT

A high-voltage power supply (10) includes: a power scaling section (130) that receives an input voltage signal and converts the input voltage signal to a controllable DC voltage; a push-pull converter (140) for converting the controllable DC voltage to a high-frequency wave; and a voltage multiplier (200) receiving the high-frequency wave generated by the push-pull converter (140) and performing successive voltage doubling operations to generate a high-voltage DC output. In one implementation, the voltage multiplier (200) receives a square wave having a frequency of approximately 100 kHz and outputs an adjustable DC voltage of approximately 0-to-30 kV. In one implementation, the high-voltage power supply (10) includes an insulation system (250) for the voltage multiplier module (200), such an insulation system being formed of n insulating layers and m conducting strips positioned between successive insulating layers.

18 Claims, 9 Drawing Sheets

U.S. PATENT DOCUMENTS

| | | | |
|---|---|---|---|
| 4,151,412 A | | 4/1979 | Aime et al. |
| 4,251,857 A | * | 2/1981 | Shelly .................. 363/26 |
| 4,517,472 A | | 5/1985 | Ruitberg et al. |
| 4,723,079 A | | 2/1988 | Norton |
| 4,893,227 A | * | 1/1990 | Gallios et al. ............ 363/26 |
| 5,138,249 A | * | 8/1992 | Capel .................. 323/283 |
| 5,218,194 A | | 6/1993 | Garbi et al. |
| 5,289,360 A | * | 2/1994 | Canova ............... 363/21.02 |
| 5,414,224 A | * | 5/1995 | Adasko et al. .......... 174/262 |
| 5,578,112 A | | 11/1996 | Krause |
| 6,078,180 A | | 6/2000 | Jenkinson |
| 6,141,225 A | * | 10/2000 | Gak et al. ................ 363/25 |
| 6,157,021 A | | 12/2000 | Fish |
| 6,370,039 B1 | | 4/2002 | Telefus |
| 2001/0010637 A1 | | 8/2001 | Schlecht |
| 2001/0020653 A1 | | 9/2001 | Wilson et al. |

FOREIGN PATENT DOCUMENTS

| | | |
|---|---|---|
| JP | 10-134989 A | 5/1998 |

OTHER PUBLICATIONS

Hannalla, A.Y. et al., "A new method of solution of electric-field problems in nonisotropic materials with built-in conducting strips using the nodal method," IEEE Proceedings, vol. 132, Pt. B, No. 4, Jul. 1985, pp. 223-231.

* cited by examiner

FIG.7E n = # OF INSULATING LAYERS
m = # OF CONDUCTING STRIPS PER LAYER
b = THICKNESS OF INSULATING LAYER
Ka = WIDTH OF CONDUCTING STRIP
A = WIDTH OF COMPOSITE INSULATION SYSTEM
B = THICKNESS OF COMPOSITE INSULATION SYSTEM

HIGH-VOLTAGE POWER SUPPLY

RELATED APPLICATIONS

This application claims priority under 35 U.S.C. § 119(e) of U.S. Provisional Application 60/422,845 filed on Nov. 1, 2002, the entire contents of which are herein incorporated by reference.

FIELD OF THE INVENTION

This invention relates to power supply technology, and more particularly to a high-voltage power supply with improved kV/volume characteristics.

BACKGROUND OF THE INVENTION

A typical voltage supply, e.g., for supplying DC power to a high-voltage load, utilizes power electronics including a transformer to provide voltage step-up and isolation between the input and output and a voltage multiplier stage of suitable configuration for generating the required high-voltage from the transformer output. Normally, high-voltage power supplies for aerospace applications are large in size, typically larger than 0.5 cubic ft., due to such factors as insulation requirements, operating frequency, the large number of voltage doubling stages in the voltage multiplier, which is required for the typical input to the voltage multiplier (e.g., 25 V), and the size of magnetic components (inductor and transformer) in the power electronics. Furthermore, increasing output voltage ripple and voltage drop often occurs under load due to operation characteristics of the successive voltage doubling stages.

SUMMARY

One aspect of the present invention is directed to a high-voltage power supply. According to one aspect, the present invention is directed to a continuously variable, high-voltage power supply. A high-voltage power supply in accordance with an embodiment of the present invention comprises: a power scaling section receiving an input voltage signal and converting the input voltage signal to a controllable DC voltage; a push-pull converter for converting the controllable DC voltage to a high-frequency wave; and a voltage multiplier receiving the high-frequency wave generated by the push-pull converter and performing successive voltage doubling operations to generate a high-voltage DC output. Another aspect of the present invention is directed to a method for providing high-voltage power. A method for providing high-voltage power in accordance with an embodiment of the present invention comprises: receiving an input voltage signal and converting the input voltage signal to a controllable DC voltage at a power scaling section; converting the controllable DC voltage to a high-frequency wave using a push-pull converter; and receiving the high-frequency wave generated by the push-pull converter and performing successive voltage doubling operations to generate a high-voltage DC output.

BRIEF DESCRIPTION OF THE DRAWINGS

A more complete understanding of the present invention will become apparent from the following description taken in conjunction with the accompanying drawings, wherein.

DETAILED DESCRIPTION

Other aspects and advantages of the invention will become apparent upon reading the following Detailed Description, with reference to the accompanying drawings.

Figure 1:
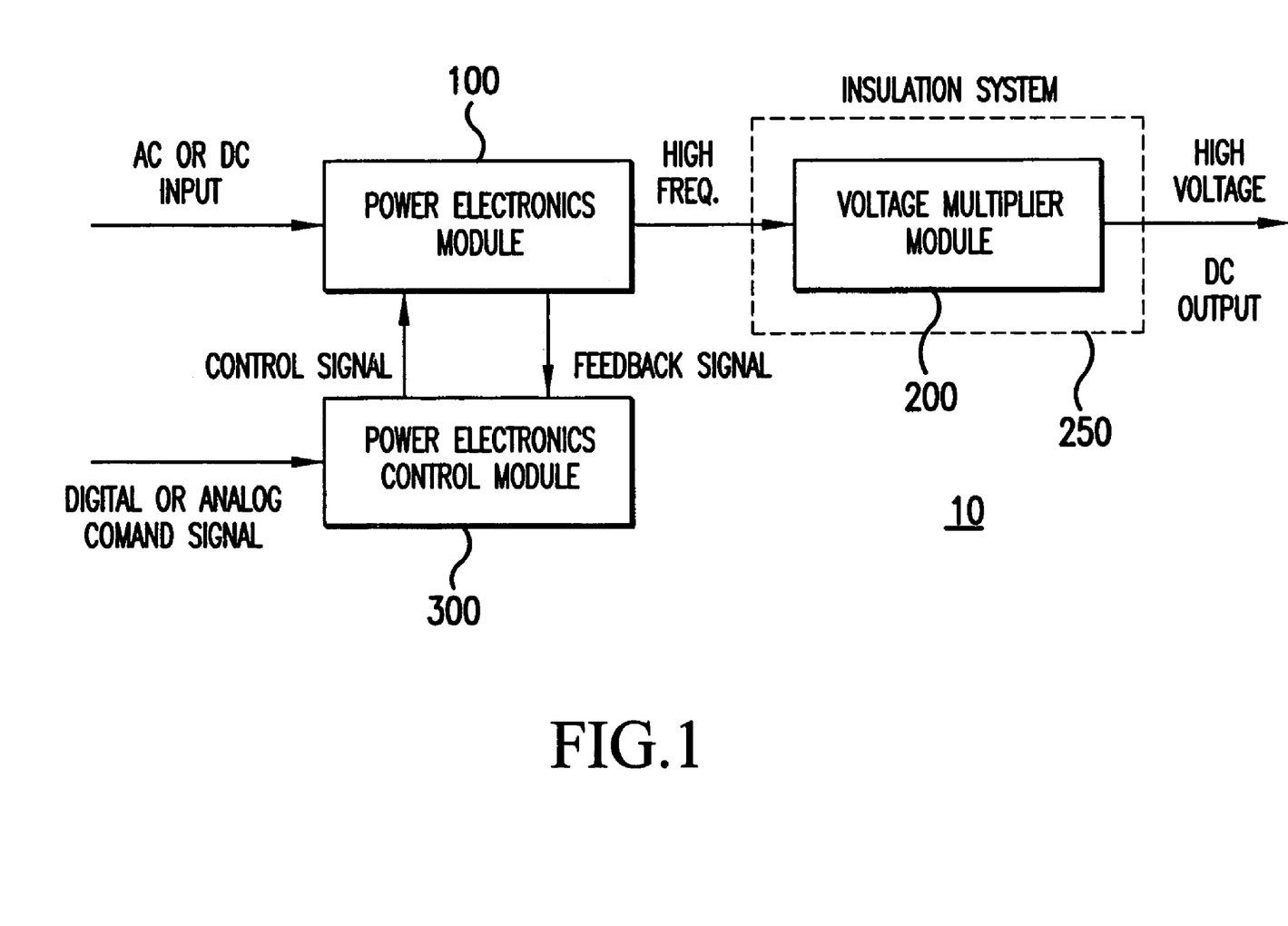
FIG. 1 is a functional block diagram of a high-voltage power supply system according to an embodiment of the present invention.

FIG. 1 illustrates a functional block diagram of the high-voltage power supply (HVPS) 10 in accordance with principles of the present invention. Generally, the HVPS 10 converts DC (Direct Current) or AC (Alternating Current) voltage to isolated, high-accuracy, continuously adjustable high DC voltage, e.g., in the order of tens of kilovolts (kV). The power supply 10 configured in accordance with principles of the present invention may have a kV/Volume of as high as 0.6 kV/in$^3$ and a kV/Weight of as high as 30 kV/lb. The power supply may be naturally cooled (e.g., convection cooling) and operate in a wide range of environments (e.g., earth at sea level to outer space).

The HVPS 10 shown in FIG. 1 comprises three main modules: a power electronics module 100; a voltage multiplier module 200; and a power electronics control module 300. The power electronics module 100 converts the input AC or DC voltage to an adjustable DC voltage and then converts the adjustable DC voltage to a high frequency wave, which is a square-wave in a preferred embodiment, of adjustable amplitude. In one implementation of the present invention, the high-frequency wave generated by the power electronics module 100 has a frequency greater than approximately 20 kHz. In one preferred embodiment of the present invention, the high-frequency wave generated by the power electronics module 100 has a frequency of approximately 100 kHz. The power electronics module 100 uses high-frequency operation to reduce the need for bulky and heavy reactive elements. In addition, the high-frequency operation increases the power density of the HVPS 10 and reduces output voltage ripple and voltage drop conditions under load for reasons discussed in detail below. A high frequency transformer of the power electronics module 100 provides isolation between the input and output.

The voltage multiplier module 200 converts the high frequency wave output by the power electronics module 100 to high-voltage. In one implementation of the present invention, the voltage multiplier module 200 is able to output an adjustable voltage of up to greater than approximately 1 kV DC. In a preferred embodiment of the present invention, the voltage multiplier module is able to output an adjustable voltage of up to approximately 30 kV DC. The upper range of the HVPS 10 output can be increased further by using a greater number of voltage doubling stages. An insulation system 250 is provided for with the voltage multiplier module 200. The insulation system 250 (discussed in detail below) allows high voltages in small volume. The control module 300 adjusts the amplitude of the wave output of the power electronics module 100 according to an analog or a digital command signal, in a closed-loop.

More specifically, the power electronics module 100 receives a power signal, e.g., 28-V, DC, and a variable command signal, e.g., 0-10 V, DC, that represents a continuously variable high-voltage power supply output voltage, e.g., in the range 0-to-30 kV DC. In the power electronics module 100, a so-called "buck-converter" is employed to convert the input voltage to a controllable DC voltage as a function of the desired output voltage. Then, a push-pull converter is used to convert this voltage to a high-frequency wave voltage, e.g., with a square wave having an amplitude of approximately 0-to-1 kV. A closed-loop control system, using a feedback signal between the power electronics module 100 and the power electronics control module 300, ensures that the output voltage of the HVPS 10 follows the command.

Figure 2:
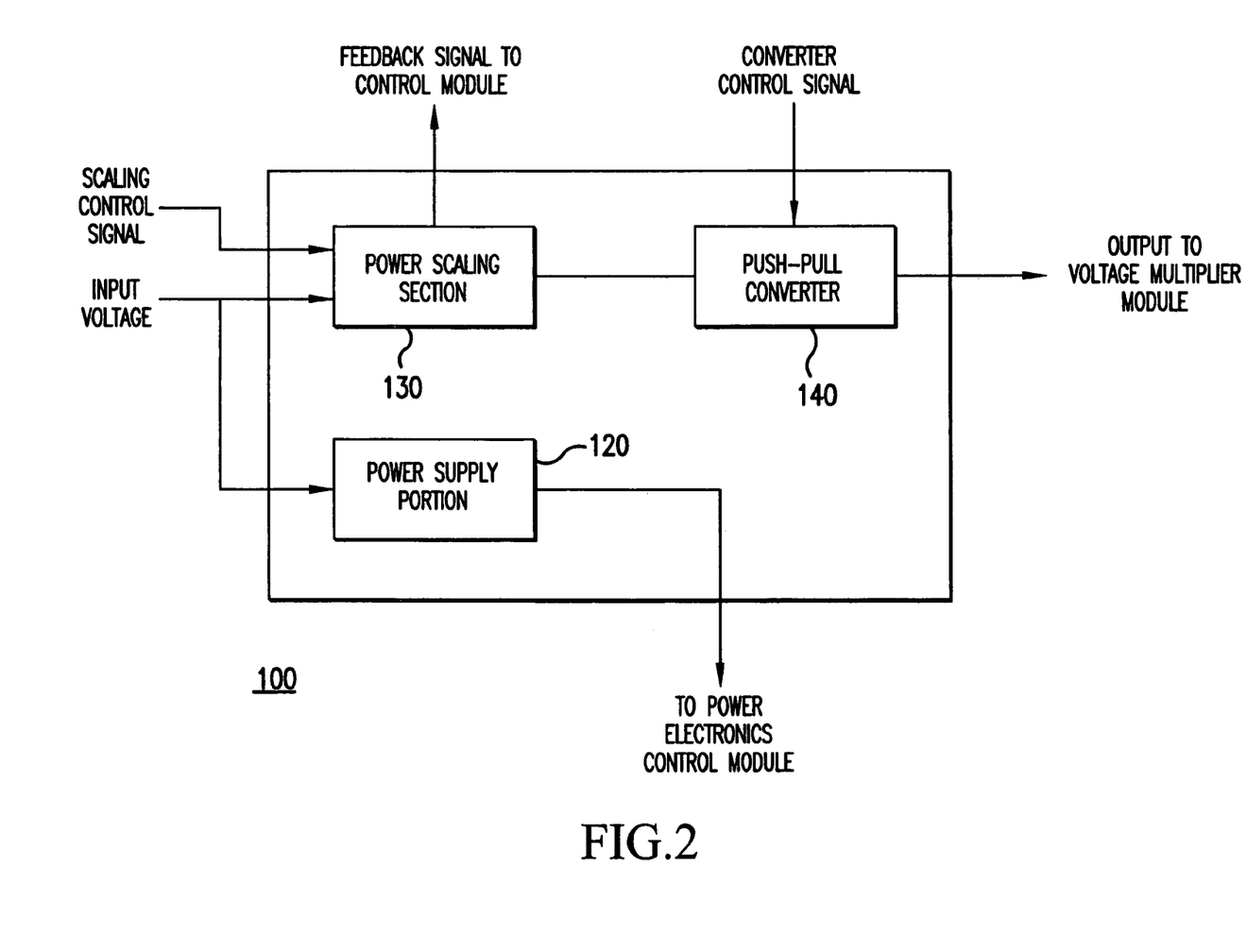
FIG. 2 is a functional block diagram of a power electronics module according to an embodiment of the present invention.

FIG. 2 is a functional block diagram of a power electronics module 100 according to an embodiment of the present invention. As seen in FIG. 2, the power electronics module 100 includes: a power scaling section 130; a push-pull converter 140; and a power supply portion 120. The power scaling section 130 is a buck-converter, which receives an input power signal, e.g., 28-V, DC, and a scaling control signal representing a desired high-voltage power supply output voltage. The power scaling section 130 includes a switching element Q1, which is gated ON/OFF by a switch gating signal received from the power electronics control module 300 to convert the input power signal to a controllable DC voltage, e.g., in the range of 0-28V.

The push-pull converter 140 converts the output of the power scaling section 130 to a high-frequency wave voltage, e.g., with a peak value of 0-1kV, using a high-frequency transformer configuration discussed in more detail below. The high-frequency wave generated by the push-pull converter 140 is a square-wave in accordance with an implementation of the present invention, thereby facilitating subsequent voltage multiplication and improving stability characteristics, including lower voltage drop and ripple levels, of the HVPS 10. The push-pull converter 140 provides isolation as well as voltage step-up between the input and output. The high-voltage output by the push-pull converter 140 allows the voltage multiplier module 200 to achieve the required range of output voltages with fewer voltage doubling stages. For example, if the maximum required output voltage of the HVPS 10 is 30 kV DC and the push-pull converter outputs 0-to-1 kV, the voltage multiplier may be implemented with 16 doubling stages. In this implementation, the extra voltage doubling stage is provided to compensate for voltage drop across the diodes at each voltage multiplier stage, to compensate for voltage drop under load, and to ensure that a 30 kV DC output voltage can be obtained over the entire range of the output load, which may cause losses in each stage of the voltage multiplier module. In one implementation of the present invention discussed below, the voltage multiplier stages are divided among two boards (e.g., 8 stages per board).

The power supply portion 120 receives the input power signal and generates supply voltages (e.g., 5V, 15V) for the various circuitry of the power electronics control module 300. The power supply portion 120 is an optional element, in that the supply voltages may be provided externally.

Figure 3:
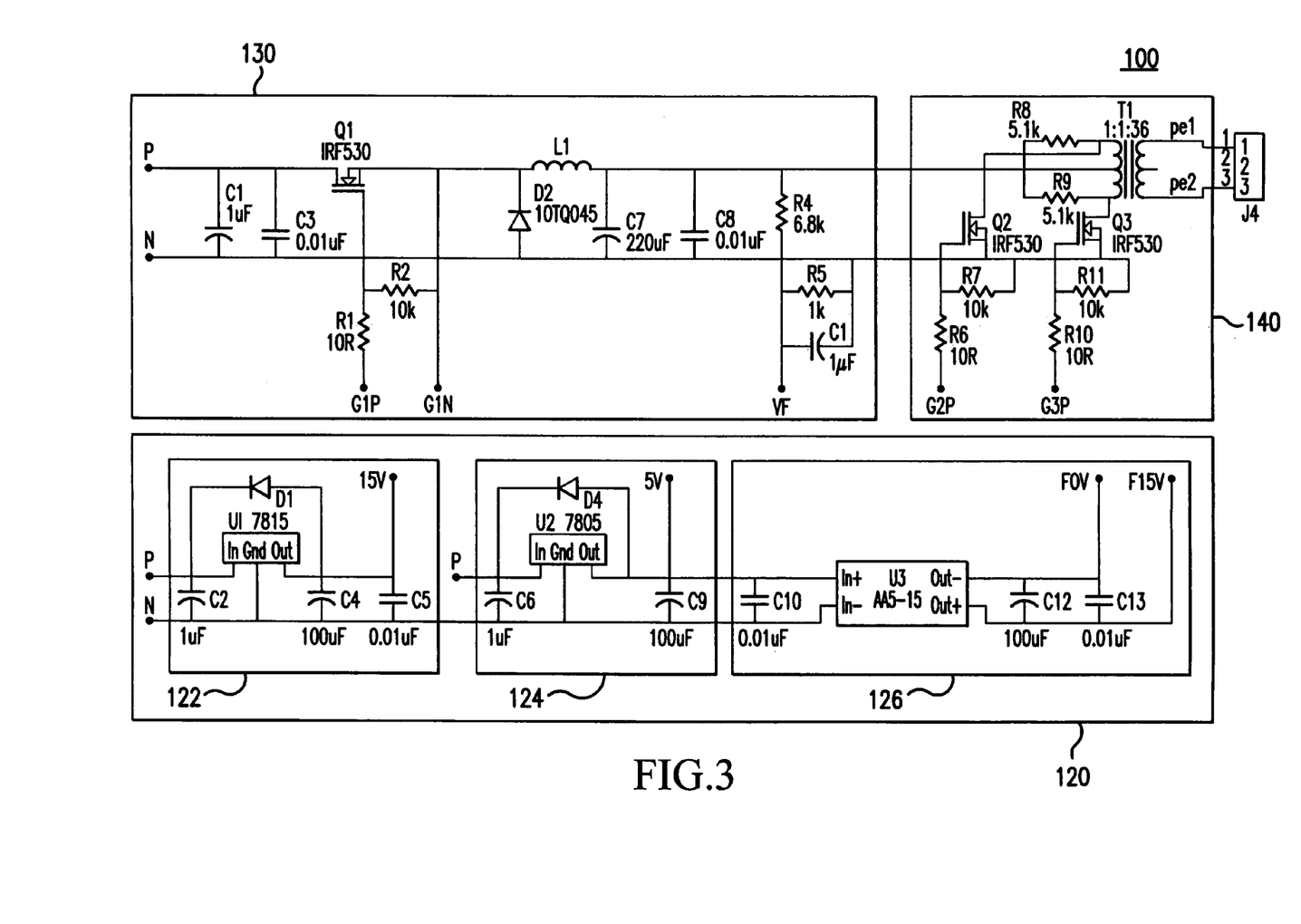
FIG. 3 is a schematic illustration of a power electronics module of the high-voltage power supply system according to an exemplary implementation of the present invention.

FIG. 3 illustrates schematic details of a power electronics module 100 according to an implementation of the present invention, including exemplary implementation details for the power scaling section 130, the push-pull converter 140, and the power supply portion 120. As seen in FIG. 3, the exemplary implementation of the power scaling section 130 is connected (via connections P, N) to receive the input power signal, which is DC power in the exemplary implementation of FIG. 3. The power scaling section 130 includes a switching element Q1, such as IRF 530 MOSFET, the duty cycle of which is controlled to scale the input voltage in accordance with a switch-gating signal G1P received from the power electronics control module 300. The power scaling section 130 shown in FIG. 3 includes resistors R1 and R2 for applying the gating signal G1P to the switching element Q1. The power scaling section 130 further includes a filtering arrangement, including inductor L1 and capacitors C7 and C8, for smoothing/filtering the scaled output voltage and an RC configuration, including resistors R4, R5, and capacitor C11, for generating a feedback signal VF representing the output of the power scaling section 130, which is fed back to the power electronics control module 300. The resistors R4 and R5 act as a voltage divider to produce the feedback signal VF and capacitor C11 filters the feedback signal. The power scaling section 130 further includes a configuration of capacitors C1, C3 for filtering the input voltage to reduce input voltage noise, and a diode D2, which is a freewheeling diode for the buck converter arrangement of FIG. 3.

The push-pull converter 140 includes a high-frequency transformer Ti, e.g., having a turns ratio of 1:1:36, to provide voltage isolation and step-up between the input and output, and a pair of switches, Q2 and Q3, that are switched in accordance with switch gating signals G2P and G3P received from the power electronics control module 300. The switches Q2 and Q3 may be MOSFET type semiconductor switches, such as IRF 530 switched at a high rate, such as 100 kHz.

Thus, the switches Q2 and Q3, connected to the primary winding of the transformer T1, provide the transformer with a high-frequency voltage, which is stepped-up by the transformer T1 for output to the voltage multiplier module 200. The push-pull converter 140 further includes an arrangement of resistors R6, R7 for providing the switch gating signal to switch Q2 and resistors R10, R11 for providing the switch gating signal to switch Q3.

The power supply portion 120 according to the implementation of FIG. 3 includes a first voltage supply section 122 and a second voltage supply section 124. The first supply section 122 may be implemented as shown in FIG. 3 using a 15V voltage regulator U1 (e.g., a 7815 integrated circuit). The schematic for the first supply section 122 in FIG. 3 includes capacitor C2 for filtering the input voltage, capacitors C4, C5 for filtering the output voltage of the 15V voltage regulator U1, and a feedback diode D1 acting as a bypass diode. The second supply section 124 may be implemented using a 5V voltage regulator U2 (e.g., a 7805 integrated circuit). The schematic for the second supply section 124 in FIG. 3 includes capacitors C6 and C9 for input filtering and output filtering, and a bypass diode D4. The power supply module 120 for the exemplary implementation illustrated in FIG. 3 further includes a third supply section 126, which provides an isolated 15 V supply for the switching element Q1 of the power scaling section 130. The third supply section 126 includes an isolated DC to DC converter U3 (e.g., AA5-15 integrated circuit) and capacitors C10, C12, C13 for filtering.

Figure 4:
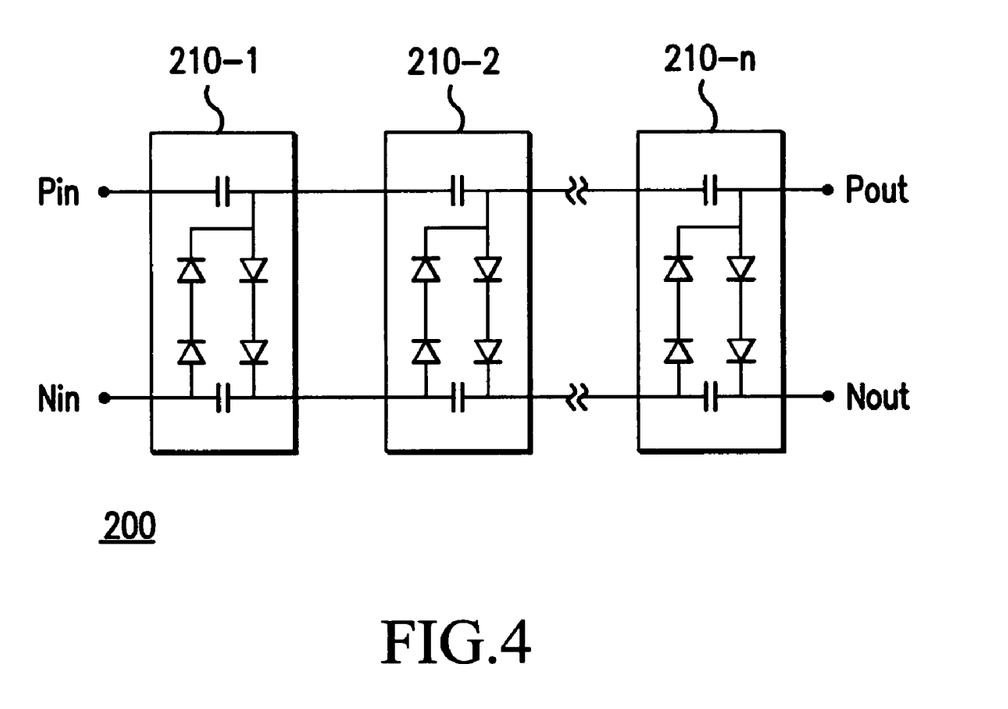
FIG. 4 is a schematic illustration of the voltage multiplier module of the high-voltage power supply system according to an exemplary implementation of the present invention.

FIG. 4 illustrates a circuit configuration for an embodiment of the voltage multiplier 200. The voltage multiplier includes a plurality of voltage multiplier stages 210-1, 210-2, ..., 210-$n$, each comprising a plurality of capacitors and diodes. As seen in FIG. 4, each voltage multiplier stage includes two branches, each with a pair of diodes. Those skilled in the art will appreciate that the number of stages and the individual values of the components will control the voltage multiplication. For example, in one configuration the capacitors can have a value of 0.1 micro Farad, and be configured in 16 stages (e.g., divided among two boards) to allow for multiplication to 30 kV DC when the maximum peak value of the wave input to the voltage multiplier module 200 is 1 kV. Those skilled in the art will appreciate that other ratings of the elements and number of voltage doubling stages will need to be selected based upon the desired output voltage level.

Figure 5:
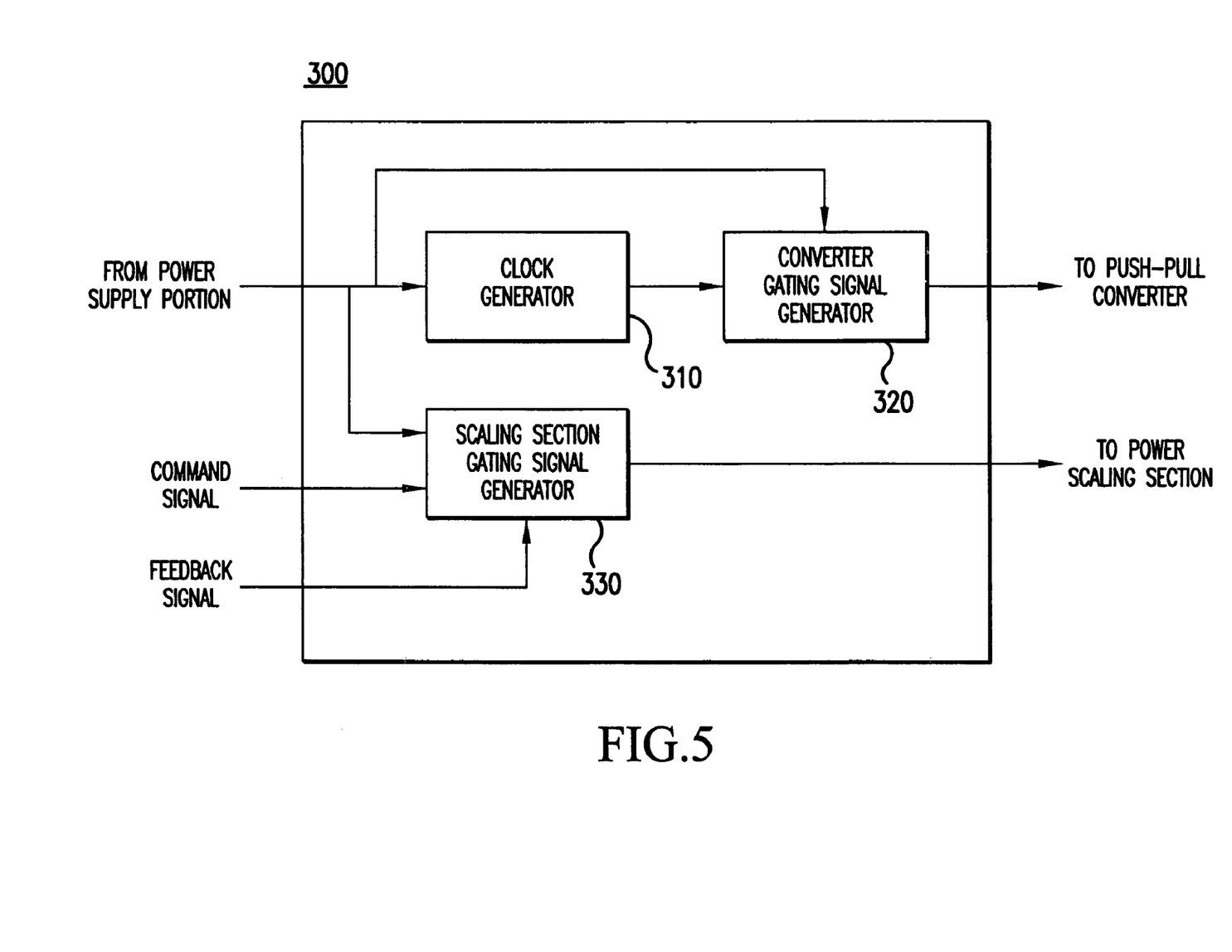
FIG. 5 is a functional block diagram of a power electronics control module of the high-voltage power supply according to an embodiment of the present invention.

FIG. 5 is a functional block diagram of a power electronics control module 300 according to an embodiment of the present invention. As seen in FIG. 5, the power electronics control module 300 includes: a clock generator 310 for generating a high-frequency clock signal; a converter gating signal generator 320 for generating a switch gating signal for the switches Q2, Q3 of the push-pull converter 140 of the power electronics module 100; and a scaling section gating signal generator 330 for generating a switch gating signal for the switch Q1 of the power scaling section 130 of the power electronics module 100. The scaling section gating signal generator 330 controls the duty cycle of the switch Q1 of the power scaling section 130 in accordance with a command signal representing the desired output voltage and a feedback VF signal from the power scaling section 130 indicating the scaled voltage magnitude output to the push-pull converter 140.

Figure 6:
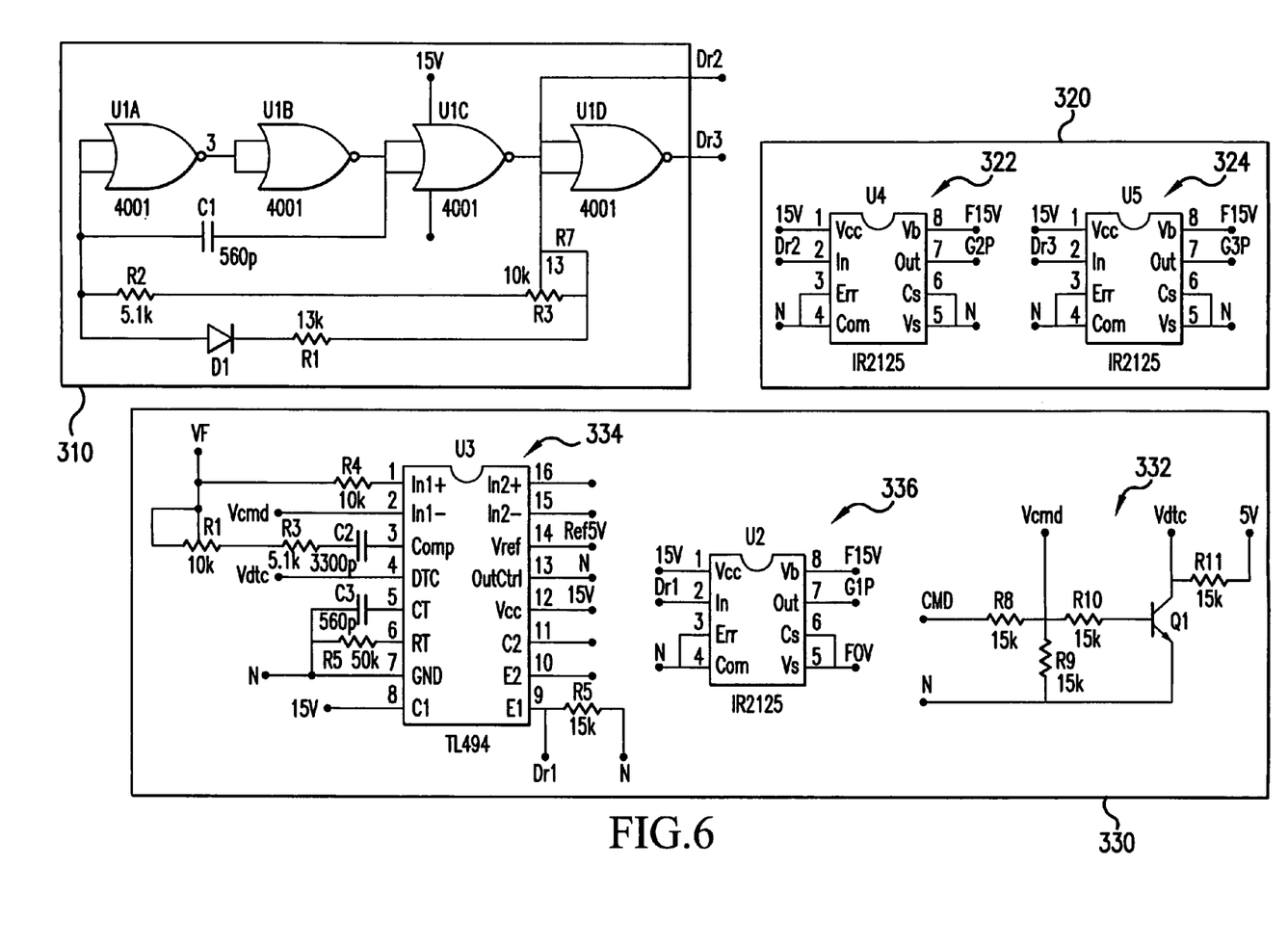
FIG. 6 is a schematic illustration of the power electronics control module of the high-voltage power supply system according to an exemplary implementation of the present invention.
Figure 7A:
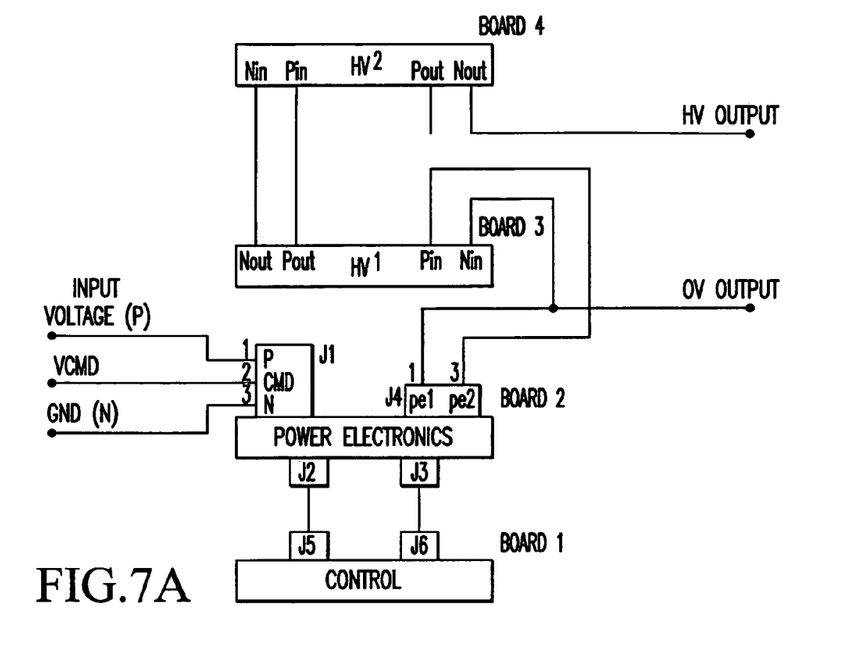
FIGS. 7A-7E illustrate a circuit board interconnection configuration for a high-voltage power supply in accordance with an exemplary implementation of the present invention.
Figure 7B:
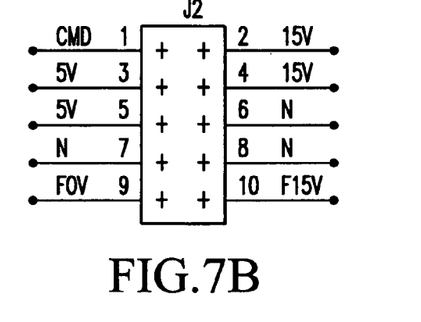
Figure 7C:
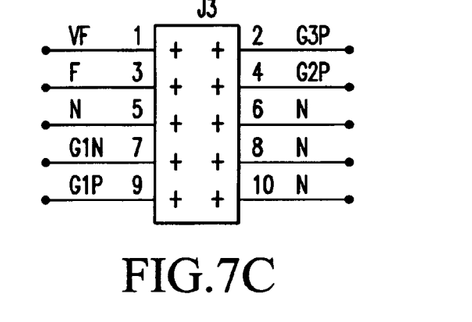
Figure 7D:
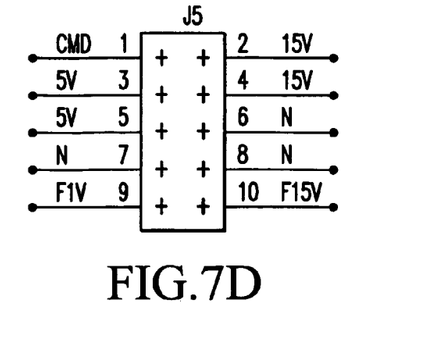
Figure 7E:
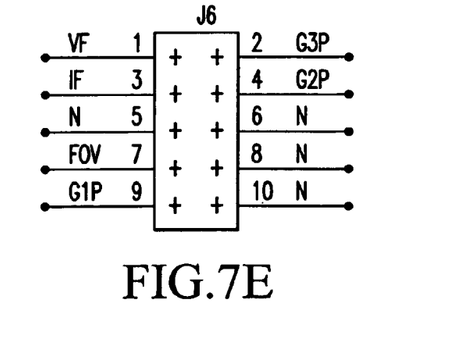

FIG. 6 is a schematic illustration of the power electronics control module 300 according to an exemplary implementation of the present invention. In FIG. 6, the clock generator 310 is implemented using a series of NOR gates U1A, U1B, U1C, and U1D, e.g., a series of two-input NOR gate CMOS integrated circuits (4001), generating gating clock signals Dr2 and Dr3. Gating clock signal Dr2, output by NOR gate U1C, is 180 degrees out of phase with gating clock signal Dr3, output by NOR gate U1D, such that switching elements Q2, Q3 of the push-pull converter 140 are driven so that only one will be on at a time, alternately. The clock generator 310 further includes circuitry, including a capacitor C1, resistors R1, R2, R3, and diode D1 for producing the frequency of the pulses at Dr2, Dr3.

The converter gating signal generator 320 in FIG. 6 may be implemented using a high-speed power MOSFET driver, such as an IR 2125 integrated circuit. A first driver 322 generates a gate switching signal G2P based on clock signal Dr2 and a second driver circuit 324 generates a gate switching signal G3P in accordance with clock signal Dr3 received from the clock generator 310. The scaling section gating signal generator 330 in FIG. 6 includes a control circuit 334 that generates a scaling control signal Dr1 based on an input command voltage Vcmd and the feedback signal VF from the power scaling section 130. In the implementation illustrated in FIG. 6, the control circuit 334 includes a switching mode power supply controller integrated circuit (e.g., a TL 494 integrated circuit) to generate Dr1. The control circuit 334 includes external components, including various resistors and capacitors, that are recommended by the chip manufacturer and are used to define the switching frequency of the PWM operation. A high-speed MOSFET power driver 336 generates a switch gating signal G1P for the switch Q1 of the power scaling section 130 based on switching control signal Dr1. The power driver 336 may be implemented using a well-known integrated circuit, such as an IR 2125 high-speed power MOSFET driver. The power electronics control module 330 illustrated in FIG. 6 further includes a control gain element 332, which includes an arrangement of resistors R8-R11 and a transistor Q1 to produce the control signal for the control circuit 334. The control gain element 332 receives an external command voltage, Cmd, and generates Vcmd, which in this implementation is scaled relative to Cmd. This scaling is performed to facilitate comparison between the command signal and the feedback signal VF as part of the closed-loop control of the output voltage of the power scaling section 130. Control gain element 332 also sets the dead time control function for control circuit 334 (Vdtc input).

FIGS. 3, 4, and 6 illustrate schematic details according to exemplary implementations of the invention. As will be appreciated by those skilled in the art, the specific elements and values shown can be interchanged with like functioning elements and appropriate combinations to achieve the same functional result (e.g., transistor types can be changed). Further, several elements or functions of groups of elements can be consolidated into single elements (e.g., Application Specific Integrated Circuits (ASICs), hybrid devices, and the like). Additionally, functional portions of the schematic can be supplied from other systems. For example, the power supply portion 120 can be replaced by suitable external power sources. One skilled in the art will appreciate a variety of circuit configurations can be used to achieve similar functional results, as illustrated by the circuits shown.

FIGS. 7A-7E (collectively referred to as "FIG. 7") illustrate a circuit board interconnection configuration for a HVPS 10 in accordance with an exemplary implementation of the present invention. In this implementation, the circuitry associated with the power electronics control module 300 is provided on a first circuit board (board 1), and the circuitry associated with the power electronics module 100 is provided on a second board (board 2). The circuitry associated with the voltage multiplier module 200 is divided among two additional boards (board 3, board 4). The circuit board of the implementation illustrated in FIG. 7 utilizes a plurality of jumpers, J1-J6, to provide connections between the various boards and external connections. In the circuit board configuration illustrated in FIG. 7, the control board (board 1) and the power electronics board (board 2) are provided below the voltage multiplier boards (boards 3, 4). The spacing between boards 1 and 2 may be considerably less than the spacing between boards 3 and 4, e.g., approximately 0.5 cm spacing as compared to approximately 2.0 cm spacing. The spacing between boards 2 and 3 should at least be as large as the spacing between boards 3 and 4.

Figure 8:
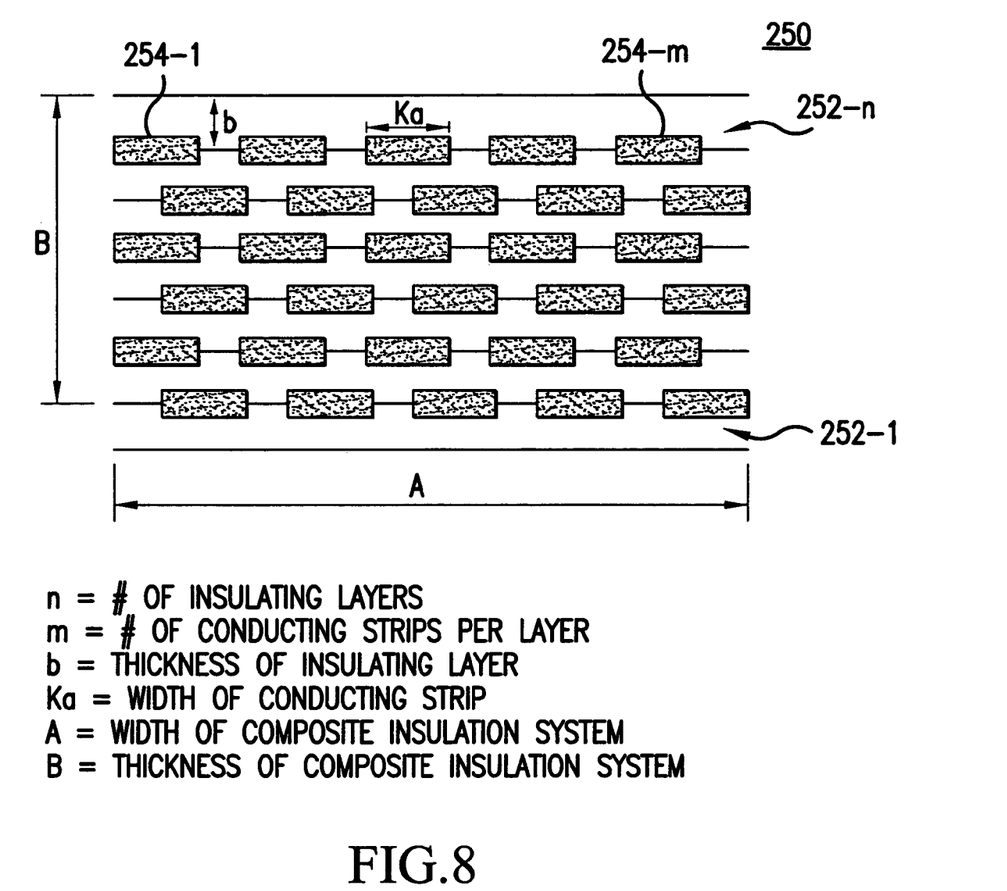
FIG. 8 is a cross-sectional view of a voltage multiplier insulation system according to an implementation of the present invention.

FIG. 8 illustrates an insulation system 250 for providing improved insulation for the circuit boards of the voltage multiplier module 200 in accordance with an implementation of the present invention. The insulation system 250 provides increased breakdown voltage magnitude by controlling the electric field within a multilayer insulation system. The insulation system 250 is constructed from n layers of insulation 252-1, ..., 252-$n$ and m very thin (e.g., less than approximately 1 mm) conducting strips 254-1, ..., 254-$m$ placed between successive insulating layers. Each layer 252-1, ..., 252-$n$ may be composed of a suitable dielectric material, such as a polymeric insulating material. The width of each conducting strip 254-1, ..., 254-$m$ is represented by Ka, the thickness of each insulting later is represented by b, the width of the composite insulation system 250 is represented by A, and the thickness of the composite insulation system is represented by B. In one implementation of the present invention the multiplier insulation composite is provided on both sides of the voltage multiplier boards (e.g., boards 3 and 4 is FIG. 7).

The conducting strips 254-1, ..., 254-m in each layer 252 are symmetrically shifted by a constant distance relative to the conductive strips in an adjacent layer, determined by a shifting factor which maximizes the withstand voltage of the insulation. The potential distribution within the composite insulation may be determined from the solution of the Laplace equation for different design parameters, to reduce the electric field. Principles underlying the insulation system 250 are described in detail in the article titled "Design of Field-Controlled Multi-layer Insulation System," IEEE Transactions on Electrical Insulation, Vol. EI-21, No. 2, April 1986, which is herein incorporated by reference in its entirety. It should be recognized that parameters of the insulation system 250, such as n and m, will depend on the particular application and characteristics of the HVPS 10.

Figure 9:
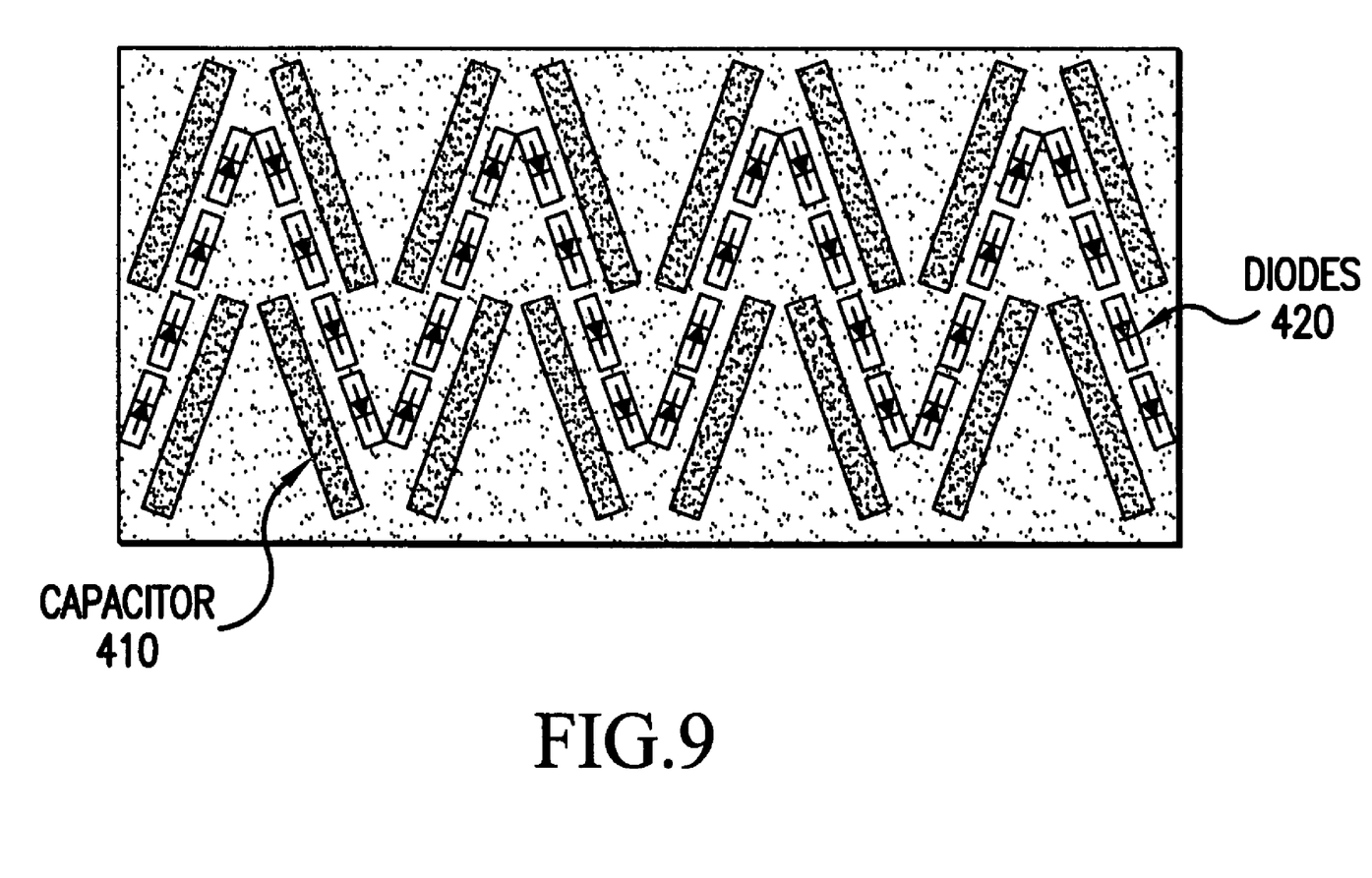
FIG. 9 is a schematic illustration of an arrangement of voltage-doubling stages in a voltage multiplier of the high-voltage power supply according to an exemplary implementation of the present invention.

To improve heat dissipation and enable the position of a greater number of voltage multiplier capacitors in a given area, one implementation of the present invention arranges the capacitors 410 of cascaded voltage doubling stages in a zig-zag pattern relative to the diodes 420, as illustrated in FIG. 9. By combining the insulation and thermal management techniques set forth herein, spacing for components and clearance between voltage multiplier boards can be reduced, thereby reducing the size of the HVPS 10.

Having provided a detailed description of embodiments and exemplary implementations of the present invention, characteristics and advantages of such embodiments and exemplary implementations will next be described. Normally, in the high-voltage power supply application, a sine-wave is used as the input to the voltage multiplier. Generating a sine-wave at high-frequency is not straight forward, whereas square-wave can be produced at high frequency without a problem. Furthermore, as mentioned above, a square-wave input to the voltage multiplier module 200 facilitates voltage multiplication and increases stability of the HVPS 10 under load. Thus, in a preferred embodiment, the HVPS 10 uses a high-frequency square-wave as the input to the voltage multiplier module 200.

Normally, high-voltage power supplies are large in size due to insulation requirements and the necessary number of voltage doubling stages. If it were attempted to use a high voltage square-wave as the input to voltage multiplier of a typical power supply, the high-voltage square-wave present within the stages of voltage multiplier would tend to cause flash-over (spark) between the component terminals which have high potential difference with respect to one another. Therefore, high-voltage power supplies that would attempt to use a high-voltage square-wave cannot be made small in size. The HVPS 10 of this invention uses high-frequency square-wave at high voltage levels in a small board size.

One advantage of using high-frequency operation is reduction of the magnetic components, i.e., isolation/step-up transformer in the push-pull converter and inductor in the buck converter. Another reason for using high-frequency operation is to reduce the output voltage ripple and voltage drop under load, as will be apparent from the following discussion.

The output voltage ripple is given by the following relation:

$$\delta V = \frac{I}{fC} \frac{n(n+1)}{4} = \frac{q}{2}\left(\frac{1}{C_1} + \frac{2}{C_2} + \ldots + \frac{n}{C_n}\right) \quad \text{(equation 1)}$$

where n is the number of voltage doubler stages in the voltage multiplier and q is the charge transferred from the capacitors to the load per period. With $C_1=C_2=\ldots=C_n$, the output voltage ripple becomes:

$$\delta V = \frac{q}{C} \frac{n(n+1)}{4} = \frac{I}{fC} \frac{n(n+1)}{4} \quad \text{(equation 2)}$$

As seen, as f is increased, $\delta V$ will decrease. This is one advantage of high-frequency operation.

The output voltage drop under load ($\Delta V_o$) due to current drawn from the capacitors and transferred to the load is given by:

$$\Delta V_o = \frac{I}{fC}\left(2\frac{n^3}{3} + 2\frac{n^2}{2} + \ldots - \frac{n}{3}\right) \quad \text{(equation 3)}$$

The above relation can be simplified for n>5 as follows:

$$\Delta V_o \cong \frac{I}{fC} \frac{2n^3}{3} \quad \text{for } n > 5 \quad \text{(equation 4)}$$

or $$\Delta V_o \cong \frac{q}{C} \frac{2n^3}{3} \quad \text{for } n > 5 \quad \text{(equation 5)}$$

As seen, as f is increased, $\Delta V_o$ will decrease and as a result the maximum output voltage will increase. The maximum output voltage is given by the following equation:

$$V_{o,max} = n(2V_{max,no\ load}) - \Delta V_o \quad \text{(equation 6)}$$

In the HVPS 10 of the present invention, the potential for flash-over caused by using high-frequency square-wave is addressed through implementation of a printed circuit board and insulation design. For insulation, a field-controlled dielectric material utilizing the bulk of the insulating material rather than its surface may be used. The bulk is known to have a dielectric strength of at least 10 times that of the surface. Therefore, the size of the board carrying the voltage multiplier can be dramatically reduced. With special design of the dielectric layers, the electric field is forced to penetrate into the material where the dielectric strength is high, instead of being set up on the surface.

The power electronics control module 300 has two main tasks. The first main task is to control the buck converter to produce scaled voltage from the source voltage based on a command signal, e.g., an analog command signal between 0 and 10 V, DC. A closed-loop control adjusts the magnitude of the buck converter output voltage by adjusting the duty cycle of the MOSFET switch to control the high-voltage output of the power supply between 0 and 30 kV based on the command signal. The second main task of the power electronics control module 300 is to produce the gating pulses for the push-pull converter MOSFET switches. In one implementation, these switches are operated at 50% duty ratio and 100 kHz switching frequency. In a preferred embodiment, analog control has been selected for the control of the buck converter to take advantage of its high-speed characteristics (e.g., achieving a stable output voltage within milliseconds of the input command). To achieve reference tracking at the switching rate of 100 kHz using digital control, a large and expensive microcontroller or DSP board is needed. Analog control guarantees very good results at a reasonable size and cost.

The HVPS 10 of the present invention may be characterized by small size and weight (size: 5 cm×10 cm×15 cm, weight: <500 grams). As a result of using an insulation system 250 in the voltage multiplier module 200, the size and clearance of the printed circuit boards housing the voltage doubler stages may be dramatically reduced. Existing high-voltage power supplies using voltage multipliers formed of capacitors and diodes are large in size, as the limited insulation strength and conventional insulation design does not allow small board size and clearances. Furthermore, due to operating at a high switching frequency, the sizes and weights of the magnetic components (buck converter inductor and push-pull converter transformer) have been dramatically reduced. A third factor contributing to the reduction in size and weight of the high-voltage power supply is the fact that the power supply may be naturally cooled and does not need any additional cooling mechanism (e.g., a fan) beside a heat sink used for the switches elements.

As discussed above, the HVPS can be installed in a variety of environments, for example, MIL-E-5400 requirement, which defines environmental conditions under which the equipment must operate (including ambient temperature and pressure ranges that may be encountered by the equipment), or an unpressurized environment with ambient temperature up to 70 degree C. The operating altitude may vary from sea level to 16,000 m.

We claim:

1. A high-voltage power supply, comprising:
    a power scaling section receiving an input voltage signal and converting said input voltage signal to a controllable DC voltage;
    a push-pull converter for converting said controllable DC voltage to a high-frequency wave; and
    a voltage multiplier receiving said high-frequency wave generated by said push-pull converter and performing successive voltage doubling operations to generate a high-voltage DC output, the generated high-voltage DC output being varied as said controllable DC voltage varies,
    wherein:
        said voltage multiplier includes a plurality of voltage doubler stages on a circuit board,
        said high-voltage power supply further comprises an insulation system associated with said circuit board, and
        said plurality of voltage doubler stages are divided among multiple circuit boards, separate from said power scaling section and said push-pull converter.

2. The high-voltage power supply of claim 1, further comprising:
    a control module for controlling said power scaling section and said push-pull converter.

3. The high-voltage power supply according to claim 2, wherein
    said power scaling section includes a switching element, a duty cycle of which controls the amplitude of said controllable DC voltage, and
    said control module outputs a gate switching signal to said switching element of said power scaling section as a function of a desired output voltage of the high-voltage power supply.

4. The high-voltage power supply according to claim 3, wherein said control module receives a feedback signal based on the output of said power scaling section to adjust said gate switching signal.

5. The high-voltage power supply according to claim 2, wherein
    said push-pull converter includes a plurality of switching elements and a transformer for generating said high-frequency wave, and
    said control module outputs gate switching signals to the switching elements of said push-pull converter to control the frequency of said high-frequency wave.

6. The high-voltage power supply according to claim 5, wherein said switching elements are MOSFET switching elements.

7. The high-voltage power supply according to claim 1, wherein said high-frequency wave is a square wave.

8. The high-voltage power supply according to claim 1, wherein the frequency of said high-frequency wave is approximately 100 kHz.

9. The high-voltage power supply according to claim 1, wherein said controllable DC voltage is in the range of approximately 0-to 28 V.

10. The high-voltage power supply according to claim 1, wherein said power supply generates an output voltage of in the range of approximately 0-to-30 kV, DC.

11. The high-voltage power supply according to claim 1, wherein said high-frequency wave has an amplitude of approximately 0-to-1 kV.

12. The high-voltage power supply according to claim 2, wherein said control module is an analog controller.

13. The high-voltage power supply according to claim 1, wherein said insulation system is a multi-layer system of n layers of insulation and m conducting strips positioned between successive insulating layers.

14. The high-voltage power supply according to claim 1, wherein said insulation system is a field-controlled multi-layer insulation system.

15. The high-voltage power supply according to claim 1, wherein the frequency of said high-frequency wave is greater than approximately 20 kHz.

16. A high-voltage power supply, comprising:
    a power scaling section receiving an input voltage signal and converting said input voltage signal to a controllable DC voltage;
    a push-pull converter for converting said controllable DC voltage to a high-frequency wave; and
    a voltage multiplier receiving said high-frequency wave generated by said push-pull converter and performing successive voltage doubling operations to generate a high-voltage DC output, the generated high-voltage DC output being varied as said controllable DC voltage varies,
    wherein:
        said voltage multiplier includes a plurality of voltage doubler stages on a circuit board,
        said high-voltage power supply further comprises an insulation system associated with said circuit board, and
        said plurality of voltage doubler stages include capacitors arranged in a zig-zag pattern.

17. A high-voltage power supply, comprising:
a power scaling section receiving an input voltage signal and converting said input voltage signal to a controllable DC voltage;
a push-pull converter for converting said controllable DC voltage to a high-frequency wave; and
a voltage multiplier receiving said high-frequency wave generated by said push-pull converter and performing successive voltage doubling operations to generate a high-voltage DC output, the generated high-voltage DC output being varied as said controllable DC voltage varies,
wherein:
said voltage multiplier includes a plurality of voltage doubler stages on a circuit board, and
said plurality of voltage doubler stages are divided among multiple circuit boards, separate from said power scaling section and said push-pull converter.

18. A high-voltage power supply, comprising:
a power scaling section receiving an input voltage signal and converting said input voltage signal to a controllable DC voltage;
a push-pull converter for converting said controllable DC voltage to a high-frequency wave; and
a voltage multiplier receiving said high-frequency wave generated by said push-pull converter and performing successive voltage doubling operations to generate a high-voltage DC output, the generated high-voltage DC output being varied as said controllable DC voltage varies,
wherein:
said voltage multiplier includes a plurality of voltage doubler stages on a circuit board, and
said plurality of voltage doubler stages include capacitors arranged in a zig-zag pattern.

* * * * *